United States Patent
He et al.

(10) Patent No.: US 10,860,073 B2
(45) Date of Patent: Dec. 8, 2020

(54) METHOD AND APPARATUS FOR TOUCH SENSOR BASED CONTROL OF INFORMATION HANDLING SYSTEM CHASSIS TEMPERATURE

(71) Applicant: Dell Products, LP, Round Rock, TX (US)

(72) Inventors: Qinghong He, Austin, TX (US); Todd D. Grabbe, Cedar Park, TX (US); Keith J. Kasprzak, Cedar Park, TX (US); Travis C. North, Cedar Park, TX (US)

(73) Assignee: Dell Products, LP, Round Rock, TX (US)

( * ) Notice: Subject to any disclaimer, the term of this patent is extended or adjusted under 35 U.S.C. 154(b) by 120 days.

(21) Appl. No.: 16/151,033

(22) Filed: Oct. 3, 2018

(65) Prior Publication Data

US 2020/0110451 A1 Apr. 9, 2020

(51) Int. Cl.
| | |
|---|---|
| *G06F 1/20* | (2006.01) |
| *G06F 1/16* | (2006.01) |
| *G06F 1/26* | (2006.01) |
| *G06F 1/3231* | (2019.01) |
| *G06F 1/3203* | (2019.01) |

(52) U.S. Cl.
CPC ............ *G06F 1/206* (2013.01); *G06F 1/1616* (2013.01); *G06F 1/203* (2013.01); *G06F 1/26* (2013.01); *G06F 1/3203* (2013.01); *G06F 1/3231* (2013.01)

(58) Field of Classification Search
CPC ... Y02D 10/173; G06F 1/3203; G06F 1/3231; G06F 1/206; G06F 1/203
See application file for complete search history.

(56) References Cited

U.S. PATENT DOCUMENTS

| | | | |
|---|---|---|---|
| 2003/0220721 A1* | 11/2003 | Cohen ................ | G05D 23/1928 700/301 |
| 2006/0193113 A1* | 8/2006 | Cohen .................... | G06F 1/203 361/679.48 |
| 2011/0251733 A1* | 10/2011 | Atkinson ................ | G06F 1/206 700/300 |

* cited by examiner

*Primary Examiner* — Terrell S Johnson
(74) *Attorney, Agent, or Firm* — Prol Intellectual Property Law, PLLC; H. Kenneth Prol

(57) ABSTRACT

An information handling system operating a chassis temperature control system may comprise an integrated circuit operatively connected to a proximity sensing strip and a processor, a temperature sensor measuring an exterior temperature of a portion of a chassis of the information handling system adjacent to the proximity sensing strip, and an orientation sensor measuring an orientation of one portion of the chassis to another portion of the chassis to indicate a laptop physical configuration of the information handling system. The integrated circuit may measure a capacitance across the proximity sensing strip such that a high capacitance measurement results in a low skin temperature limit setting, and the processor may execute code instructions of the chassis temperature control system to incrementally decrease a processor power draw limit level based on the exterior temperature measurement exceeding the low skin temperature limit setting.

20 Claims, 6 Drawing Sheets

METHOD AND APPARATUS FOR TOUCH SENSOR BASED CONTROL OF INFORMATION HANDLING SYSTEM CHASSIS TEMPERATURE

FIELD OF THE DISCLOSURE

The present disclosure generally relates to temperature control for the chassis of an information handling system. The present disclosure more specifically relates to controlling temperature of a chassis by throttling power supplied to a processor based on touch sensor data.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling needs and requirements vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. Further, the information handling system may include a touch sensor capable of detecting changes in capacitance indicating presence of a nearby human body part.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
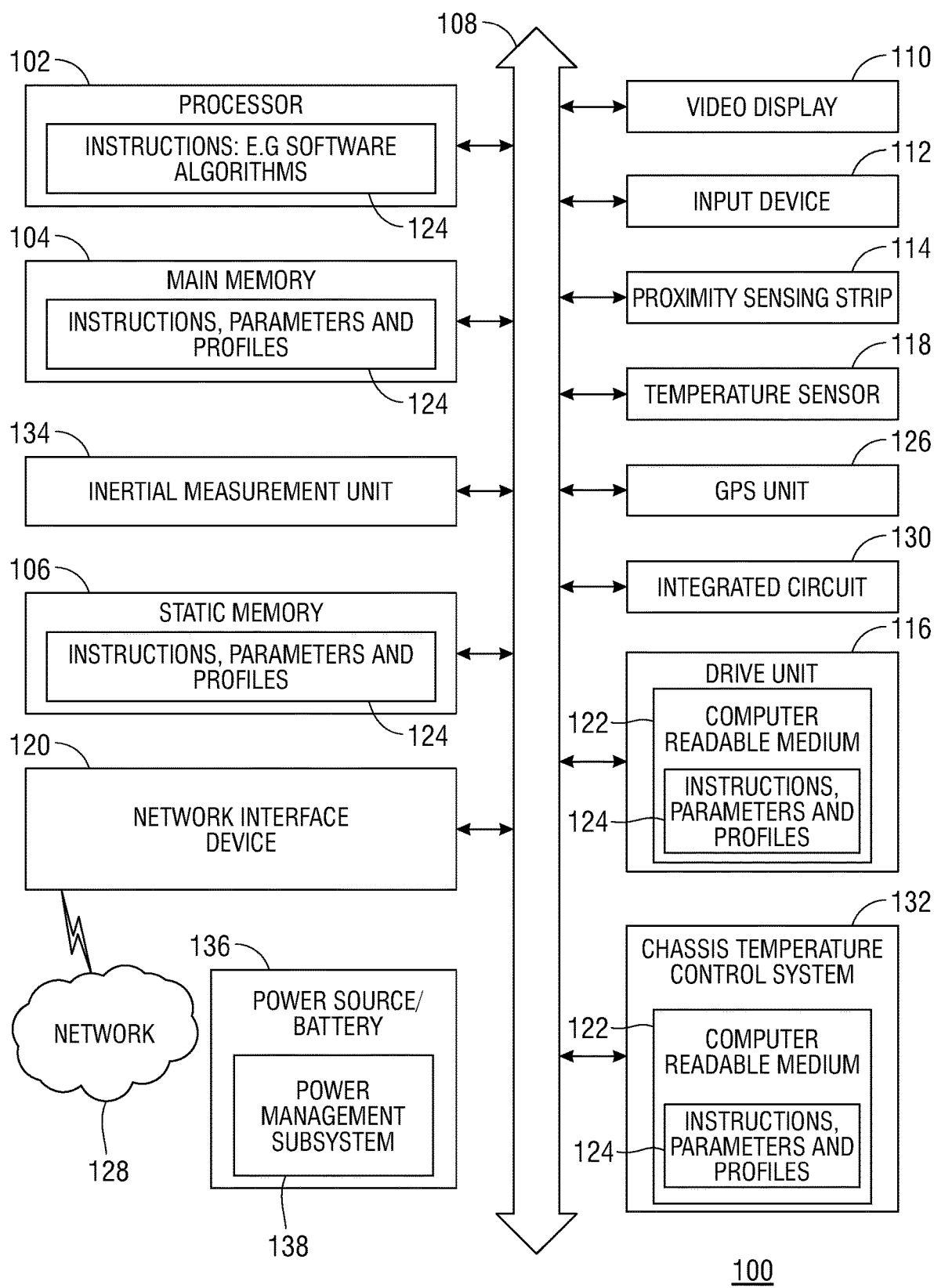
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Many mobile information handling systems such as laptop computers and tablet devices include protocols designed to keep exterior surfaces of the devices from exceeding certain safety limits. Temperature levels of an exterior chassis of an information handling system may be affected by operation of one or more internal components, including the processor. For example, many mobile information handling systems limit the amount of power supplied to the central processing unit (CPU), graphics processing unit (GPU), or other computing components (e.g. wireless network adapter) in order to limit the external temperature of the chassis. Such limitations are most important in information handling systems that may come into contact with human skin by, for example, being placed directly on a bare lap of a user or directly on a user's clothed legs.

Existing methods determine when the mobile information handling system is likely being used in such a way by monitoring data from a global positioning system (GPS) unit, an inertial measurement unit (IMU), gyroscope, accelerometer, or other motion/rotation sensor within the information handling system to determine the system has moved in either position or orientation. Such detected movement may indicate the information handling system is no longer placed directly on a tabletop or other stationary insulating surface capable of absorbing higher temperatures than a user's lap. When such movement is detected, existing methods may automatically decrease the amount of power supplied to the CPU, GPU, or other components in order to decrease the external temperature of the chassis.

However, such a decrease in power may also decrease the efficiency of the processor or other component, resulting in lower performance. When the processors receive less than maximum power, the processors may begin to prioritize tasks, thus failing to perform tasks deemed non-essential. Similarly, processors or components receiving limited power may operate in a non-optimal mode designed to conserve power. For example, a GPU may conserve power by rendering digital images in lower, sub-optimal resolutions. As another example, a wireless antenna encountering interference when transmitting may not boost power to the transmitting antenna in order to overcome such interference when operating in a lower power mode, thus resulting in sub-optimal signal quality. Because decreasing power to the processors or other components may cause sub-optimal performance, power should only be decreased to those processors or other components when necessary to ensure the chassis temperature remains safe for contact with the surface of the structure supporting its base when its placed in a laptop physical configuration.

Decreasing power to the processor when movement of the information handling system is detected may result in over-correction of the power supplied to the CPU, GPU, or other power-throttling component, and may consequently lead to unnecessary lowering of performance. For example, movement of an information handling system may be detected when the system is placed on a high-temperature resistant table or lap desk, on a user's clothed lap, or directly onto the user's skin. Current methods basing power limitations on recorded movement of the information handling system are incapable of differentiating between these states because they may each involve only slight changes in the information handling system's position or orientation. However, the temperature at which the chassis of the information handling system in each of these states may safely operate may differ greatly. For example, it may be safe to operate a mobile information handling system at up to 55 degrees Celsius when placed on a high-temperature resistant table or lap desk, while the temperature of a mobile information handling system in direct contact with a user's skin should not exceed 45 degrees Celsius. Reducing the power delivered to the processor to achieve a temperature of 45 degrees Celsius when the system is placed on a high-temperature resistant table or lap desk may markedly decrease the performance of the system unnecessarily. A method is needed to more accurately tailor the power supplied to the processor based on proximity of the information handling system to the user's skin. For example, the in an embodiment, the maximum allowable temperature for the chassis in contact with a clothed lap may be somewhere between the temperatures for contact with bare skin and contact with high temperature resistant table or lap desk.

The chassis temperature control system in embodiments of the present disclosure addresses this issue by more accurately discerning when there is a higher risk of contact (either direct or indirect) between the warmest portions of the information handling system chassis and human skin. The probability of coming into contact with human skin in embodiments may depend upon the physical configuration of the information handling system. Chassis of the information handling system of the present disclosure may be placed in a plurality of physical configurations defined by the angle of rotation between a base chassis housing a keyboard (physical or virtual) and a display chassis housing a video display. One example of a physical configuration in embodiments of the present disclosure includes a laptop configuration in which the base chassis supports the weight of the information handling system, and wherein the base chassis is rotated between zero and 180 degrees from the display chassis. The laptop configuration in embodiments may also include an information handling system placed in a dual-tablet mode in which the information handling system base chassis and display chassis each house a video display. The video display in the base chassis in such an embodiment may be capable of displaying a virtual keyboard. In such an embodiment, the information handling system may be considered to be in a laptop configuration when the base chassis and the display chassis (both housing digital displays) are rotated between zero and 180 degrees from another. When rotated 180 degrees from one another in such embodiments, the backs of their respective chassis (sides opposite the displays) may be substantially coplanar.

Another example physical configuration is a tent configuration in which the base chassis is rotated between 180 and 300 degrees from the display chassis. In the tent configuration, the thin edge of the base chassis below the bottom of the keyboard and the thin edge of the display chassis above the top of the video display may support the weight of the information handling system, placing it in a tent-like shape. In yet another example, the information handling system may be placed in a tablet configuration in which the base chassis is rotated between 300 and 360 degrees from the display chassis, and the portion of the base chassis housing the keyboard supports the weight of the information handling system. The hottest portion of the information handling system's chassis in embodiments of the present disclosure is most likely to come into contact with human skin when placed in a laptop physical configuration. Thus, limiting the temperature of the chassis becomes most important when the information handling system is placed in a laptop physical configuration.

However, maximizing performance of the information handling system may also be most important when the information handling system is placed in the laptop configuration. For example, many users place the information handling system in a laptop configuration when working on their computers and performing a plurality of tasks, thus consuming greater processing resources and increasing power consumed transmitting and receiving wireless signals. In contrast, the information handling system may be more likely used to perform fewer tasks, view films, or surf the internet when placed in a tent configuration or tablet configuration in some embodiments. The chassis temperature control system in embodiments of the present disclosure balance these competing needs of limiting chassis temperature and maximizing processor/component performance for information handling systems by determining the current physical configuration of the information handling system and tailoring power limitations designed to decrease the chassis temperature to environmental conditions determined by one or more sensors.

For example, when the information handling system is placed in the laptop configuration, the chassis temperature control system in embodiments may use a proximity sensing sensor to determine the likelihood the chassis will come into contact with human skin (either directly or indirectly), and limit the temperature of the chassis only when that likelihood is substantial. The chassis temperature control system in embodiments may receive measurements of capacitance across proximity sensing strips along the bottom exterior chassis of the information handling system. Proximity sensors may sense nearby human body parts by detecting a change in an electro-magnetic field or the sensor. In an embodiment, a proximity sensor may receive a small voltage in order to emit a low-level electromagnetic field. In other embodiments, a passive capacitive sensor may be used to detect capacitance values when the chassis comes in contact with a surface. When a human body part comes into close proximity with the proximity sensor, the presence of the body part may change the local electric field, which may also alter the mutual capacitance across the proximity sensor. The proximity sensor may register the capacitance change at one or more locations across its surface in order to determine the position of the human body part with reference to the dimensions of the proximity sensor. In other embodiments, levels of capacitance may be detected to discern the type of surface contact occurring at the chassis bottom. In other words, the proximity sensor may be capable of detecting whether the chassis is in direct contact with human skin, indirect contact with human skin (e.g. through an article of clothing), or in contact with a highly insulating material such as one would find in a table, desk, or lap-desk (e.g. wood, plastic, tile). In such a way, the chassis temperature control system may gauge the likelihood the chassis will come into contact with human skin with greater accuracy than assuming that is the case when the information handling system undergoes any movement or rotation, as in the prior art.

The chassis temperature control system in embodiments of the present disclosure may associate the positional configuration of the information handling system and/or received measurements of capacitance across one or more proximity sensing strips in the information handling system chassis with a base chassis support material type. For example, the tablet configuration in some embodiments may be associated with a direct skin contact base support type because the information handling system is presumably being handled by the user when placed in the tablet configuration. In other embodiments, the tablet configuration may be associated with a highly insulating base support type because the base chassis is in contact with the display chassis when placed in tablet mode, thus resulting in very low likelihood the base chassis will contact human skin. In another example, the laptop configuration and a high relative capacitance across the proximity sensing strips may indicate the base chassis is not in direct or indirect contact with human skin, and may be associated with a highly insulating base support material type such as a desk. As another example, the laptop configuration and a low relative capacitance across the proximity sensing strips may indicate the base chassis is being supported by a bare lap, and may be associated with direct skin contact. As yet another example, the laptop configuration and a medium relative capacitance across the proximity sensing strips may indicate the base chassis is being supported by the user's clothed lap, and may be associated with indirect skin contact.

Each base support material type (e.g. direct skin contact, indirect skin contact, insulating material) may also be associated with a maximum temperature threshold at which safety standards may be ensured. For example, the insulating material type may be associated with a temperature threshold of 55 degrees Celsius, the indirect skin contact type may be associated with a temperature threshold of 50 degrees Celsius, and the direct skin contact type may be associated with a temperature threshold of 45 degrees Celsius. The chassis temperature control system in embodiments may then maintain the current power level supplied to the processor, or incrementally increase or decrease the power supplied to the processor until the processor reaches the temperature threshold associated with the current base support material type, or until the power delivered to the processor reaches a maximum allowable limit. In such a way, the chassis temperature control system in embodiments of the present disclosure may optimize CPU, GPU, or other component performance while maintaining safe chassis temperatures, dependent upon the current physical configuration and likelihood of the information handling system chassis contact human skin.

FIG. 1 illustrates an information handling system 100 similar to information handling systems according to several aspects of the present disclosure. In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP), a base station transceiver, a wireless telephone, a land-line telephone, a control system, a camera, a scanner, a facsimile machine, a printer, a pager, a personal trusted device, a web appliance, or any other suitable machine capable of executing a set of instructions (sequential or otherwise) that specify actions to be taken by that machine, and can vary in size, shape, performance, price, and functionality.

In a networked deployment, the information handling system 100 may operate in the capacity of a server or as a client computer in a server-client network environment, or as a peer computer system in a peer-to-peer (or distributed) network environment. In a particular embodiment, the computer system 100 can be implemented using electronic devices that provide voice, video or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or multiple sets, of instructions to perform one or more computer functions.

The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses 108 operable to transmit communications between the various hardware components. Portions of an information handling system may themselves be considered information handling systems.

Information handling system 100 can include devices or modules that embody one or more of the devices or execute instructions for the one or more systems and modules described above, and operates to perform one or more of the methods described above. The information handling system 100 may execute code instructions 124 that may operate on servers or systems, remote data centers, or on-box in individual client information handling systems according to various embodiments herein. In some embodiments, it is understood any or all portions of code instructions 124 may operate on a plurality of information handling systems 100.

The information handling system 100 may include a processor 102 such as a central processing unit (CPU), control logic or some combination of the same. In some embodiments, the processor 102 may be a graphics processing unit (GPU). Any of the processing resources may operate to execute code that is either firmware or software code. Moreover, the information handling system 100 can include memory such as main memory 104, static memory 106, computer readable medium 122 storing instructions 124 of the chassis temperature control system 132, and drive unit 116 (volatile (e.g. random-access memory, etc.), nonvolatile (read-only memory, flash memory etc.) or any combination thereof). The information handling system 100 can also include one or more buses 108 operable to transmit communications between the various hardware components such as any combination of various input and output (I/O) devices.

As shown, the information handling system 100 may further include a host video display 110. The host video display 110 in an embodiment may function as a liquid crystal display (LCD), an organic light emitting diode (OLED), a flat panel display, a solid state display, or a cathode ray tube (CRT). Additionally, the information handling system 100 may include an input device 112, such as a keyboard, and/or a cursor control device, such as a mouse, touchpad, or gesture or touch screen input.

The information handling system 100 can also include a disk drive unit 116, and a temperature sensor 118. The temperature sensor in an embodiment 118 may be an infrared sensor located within the chassis of the information handling system 100 that is capable of determining the temperature at one or more points along the interior of the chassis. In some embodiments, the temperature sensor 118 may further include a controller capable of predicting a temperature at one or more points along the exterior of the chassis based on temperature measurements of one or more points along the interior of the chassis. In other embodiments, the temperature sensor 118 may be a thermal heat flux sensor, which may be a transducer capable of generating an electrical signal proportional to the total heat rate (e.g. convective, conductive, and/or radiative heat) applied to the surface of the sensor. Example thermal heat flux sensors may include pyranometers, Gardon gauges, circular-foil gauges, thin-film thermopiles, and Schmidt-Boelter gauges. In still other embodiments, the temperature sensor may include a thermocouple.

The information handling system 100 in an embodiment may also include a global positioning system (GPS) unit 126, an inertial measurement unit (IMU) 134, and/or other sensors (e.g. gyroscope, accelerometer) capable of measuring, alone or in tandem, the movement, rotation, or positional configuration of one or more portions of the information handling system with respect to other portions of the information handling system. For example, the information handling system 100 may include one or more hall effect sensors, hinge sensors, positional detectors, infrared (IR) or light sensors, and/or auditory sensors. The information handling system 100 in an example embodiment may include an IMU 134 located within the base chassis of the information handling system housing the keyboard input device 112, and a second IMU 134 located within the display chassis housing the video display 110. Comparing measurements taken by each of these two IMUs, the processor 102 in an embodiment may be capable of determining the positional configuration of the information handling system (e.g. laptop configuration, tablet configuration, tent configuration).

The information handling system 100 may further include a proximity sensing strip 114 operably connected to an integrated circuit 130 in an embodiment. The proximity sensing strip 114, in an embodiment, may sense nearby human body parts by detecting a capacitance across two capacitive strips. Each of the capacitive strips within the proximity sensing strip may be substantially parallel to one another such that their lengths do not touch. Each of the proximity sensing strips in at least one embodiment may comprise a wire capable of carrying a current. In other embodiments, more than two capacitive strips may be used. Each of the capacitive strips 114 in an embodiment may be placed on the base of the chassis such that the surface of the structure supporting the base of the information handling system comes into contact with two or more of the proximity sensing strips 114. When a human body part comes into contact (either directly or through clothing) with both of such capacitive strips, the body part may cause a capacitance across the two strips. A controller operably connected to the proximity sensing strips 114 may sense that capacitance and transmit messages indicating such changes have been detected to the chassis temperature control system 132.

In other embodiments, the proximity sensing strip 114 may sense nearby human body parts by detecting a change in an electro-magnetic field generated by the sensor. The proximity sensing strip 114 in an embodiment may receive a small voltage from the integrated circuit 130 in order to emit the low-level electromagnetic field. When a human body part comes into close proximity with the proximity sensing strip 114, the presence of the body part may change the local electric field of the proximity sensing strip 114, which may also alter the mutual capacitance across the proximity sensing strip 114 capacitive strips. The integrated circuit 130 in an embodiment may detect such changes in the capacitance field of the proximity sensing strip 114 and transmit messages indicating such changes have been detected to the chassis temperature control system 132.

In an example of the present disclosure, processor 102 may conduct processing of component device power utilization data by the information handling system 100, which may operate as a standalone device or may be connected, such as via a network, to other computer systems or peripheral devices. The disk drive unit 116, and static memory 106, also contains space for data storage such as a hardware implementation monitoring system data. Gathered component device utilization data may also be stored in part or in full in data storage 106 or 116 which may serve as some or all of a component device utilization data repository. Additionally, power policy settings, and energy demand estimation profiles may be stored in disk drive 116 or static memory 106. Energy demand estimation profiles may be statistical models of power consumption, power demand estimations, and productivity index determinations performed by the chassis temperature control system 132 in some embodiments. Energy policy requirements may be set by an administrator such as an IT department of an enterprise and/or may be automatically adjusted based on chassis temperature controls, power demand estimations, and/or productivity determinations. Component device utilization data in storage may also include data such as power draw data measured by the processor 102 for specific component devices or systems during information handling system operation.

The information handling system may include a power source 136 such as a battery or an A/C power source. The information handling system may also have a power management subsystem 138 with a plurality of information handling system subsystems for control of a plurality of systems. For example, the power and battery resource available to the information handling system may be managed or controlled by a power management controller 138 executing instructions of the chassis temperature control system that may access battery power state data. In some aspects, power draw measurements may be conducted with control and monitoring of power supply via the power management subsystem 138. In other aspects, power draw data may also be monitored with respect to component devices of the information handling system. In some aspects where applicable, execution of power policy may be administered partially via the power management subsystem 138. The battery 136 may include a smart battery system that tracks and provides power state data. This power state data may be stored with the instructions, parameters, and profiles 124 such as component device utilization data to be used with the systems and methods disclosed herein.

The information handling system 100 may also include the chassis temperature control system 132 that may be operably connected to the bus 108. The chassis temperature control system 132 computer readable medium 122 may also contain space for data storage. The chassis temperature control system 132 may perform tasks related to optimizing CPU, GPU, or other component power delivery while simultaneously maintaining safe chassis temperatures. In an embodiment, the chassis temperature control system 132 may communicate with the main memory 104, the processor 102, the video display 110, the alpha-numeric input device 112, and the network interface device 120 via bus 108, and several forms of communication may be used, including ACPI, SMBus, FASTBUS, Intelligent Platform Management Interface (IPMI), a 24 MHZ BFSK-coded transmission channel, or shared memory.

In other embodiments, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. For example, any of the above may operate as integrated circuit 130 to execute instructions of the chassis temperature control system 132. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The network interface device shown as wireless adapter 120 can provide connectivity to a network 128, e.g., a wide area network (WAN), a local area network (LAN), wireless local area network (WLAN), a wireless personal area network (WPAN), a wireless wide area network (WWAN), or other network. Connectivity may be via wired or wireless connection. The wireless adapter 120 may operate in accordance with any wireless data communication standards. To communicate with a wireless local area network, standards including IEEE 802.11 WLAN standards, IEEE 802.15 WPAN standards, WWAN such as 3GPP or 3GPP2, or similar wireless standards may be used. Further, inter-device connectivity may be available via WPAN standards or via Bluetooth or similar standards. It is understood that other devices such as peripheral devices may be connected via wireless or wired connectivity as well according to various protocols described herein.

The information handling system 100 can include a set of instructions 124 that can be executed to cause the computer system to perform any one or more of the methods or computer based functions disclosed herein. For example, instructions 124 may execute a chassis temperature control system 132, software agents, or other aspects or components. Various software modules comprising application instructions 124 may be coordinated by an operating system (OS), and/or via an application programming interface (API). An example operating system may include Windows®, Android®, and other OS types known in the art. Example APIs may include WinAPIs (e.g. Win32, Win32s, Win64, and WinCE), Core Java API, or Android APIs.

The disk drive unit 116 and the chassis temperature control system 132 may include a computer-readable medium 122 in which one or more sets of instructions 124 such as software can be embedded. Similarly, main memory 104 and static memory 106 may also contain a computer-readable medium for storage of one or more sets of instructions, parameters, or profiles 124. The disk drive unit 116 and static memory 106 also contain space for data storage. Further, the instructions 124 may embody one or more of the methods or logic as described herein. For example, instructions relating to the chassis temperature control system 132 software algorithms may be stored here. In a particular embodiment, the instructions, parameters, and profiles 124 may reside completely, or at least partially, within the main memory 104, the static memory 106, and/or within the disk drive 116 during execution by the processor 102 of information handling system 100. As explained, some, or all of the chassis temperature control system 132 may be executed locally or remotely. The main memory 104 and the processor 102 also may include computer-readable media.

Main memory 104 may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The chassis temperature control system 132 and the drive unit 116 may include a computer-readable medium 122 such as a magnetic disk, or a static memory in an example embodiment. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In other embodiments, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device). The system, device, controller, or module can include software, including firmware embedded at a device, such as an Intel® Core class processor, ARM® brand processors, or other processors and chipsets, or other such device, or software capable of operating a relevant environment of the information handling system. The system, device, controller, or module can also include a combination of the foregoing examples of hardware or software. Note that an information handling system can include an integrated circuit or a board-level product having portions thereof that can also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another can communicate directly or indirectly through one or more intermediaries.

Figure 2:
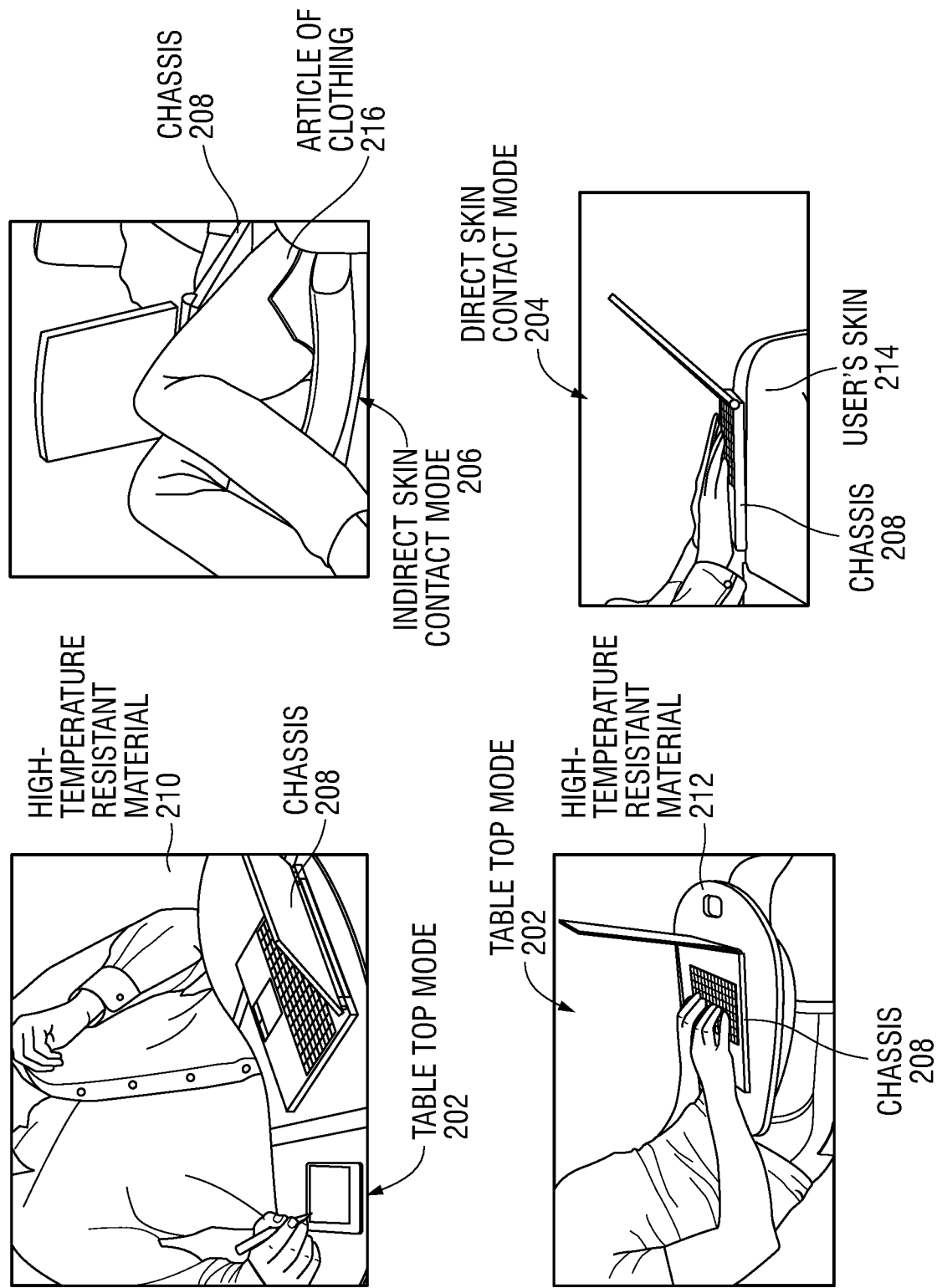
FIG. 2 is a graphical diagram of a plurality of base support material types of a mobile information handling system according to an embodiment of the present disclosure.

FIG. 2 is a graphical diagram of a plurality of base support material types of a mobile information handling system, each associated with a different chassis temperature threshold according to an embodiment of the present disclosure. Many mobile information handling systems such as laptop computers and tablet devices include protocols for limiting power delivered to a CPU, GPU, or other component, which are designed to keep exterior surfaces of the devices from exceeding certain safety limits. Such limitations are most important in information handling systems that may come into contact with human skin by, for example, being placed directly on a bare lap of a user or directly on a user's clothed legs. Existing methods may automatically decrease the amount of power supplied to the CPU, GPU, or other component, and consequently decrease performance of the system, when any movement of the information handling system is detected (indicating it has been moved from a stationary table top environment) in order to decrease the external temperature of the chassis. In other words, prior art systems apply power limitations to components when any motion of the information handling system is detected because it is assumed the information handling system is in contact with human skin when it is moving.

When the processors receive less than maximum power, the processors may begin to prioritize tasks, thus failing to perform tasks deemed non-essential. Similarly, processors or components receiving limited power may operate in a non-optimal mode designed to conserve power. For example, a GPU may conserve power by rendering digital images in lower, sub-optimal resolutions. As another example, a wireless antenna encountering interference when transmitting may not boost power to the transmitting antenna in order to overcome such interference when operating in a lower power mode, thus resulting in sub-optimal signal quality. The chassis temperature control system in an embodiment of the present disclosure may limit power supplied to the CPU, GPU, or other component using a variety of power limiting methods. Example power limiting methods may include lowering a processor's clocking speed, decreasing the number of processing cores in operation, or throttling processing at a CPU or GPU. Other examples of power limiting methods may include dynamic frequency scaling or dynamic voltage scaling. Because decreasing power to the processors or other components may cause sub-optimal performance, power should only be decreased to those processors or other components when necessary to ensure the chassis temperature remains safe for contact with the surface of the structure supporting its base when there is a high likelihood of contact between the chassis and a user's skin.

The chassis temperature control system in an embodiment may differentiate between several different base support material types, based on touch sensor feedback such as capacitance feedback, in order to maximize CPU, GPU, or other component performance while maintaining safe chassis temperatures. Heat generation for the chassis may be generated by processors such as the GPU/CPU or other components and reduction of heat may be achieved by reducing power or operation levels of those processors and components. The chassis temperature control system in an embodiment may be capable of differentiating touch sensor feedback between a highly insulating base support material 202, a direct skin contact 204, and an indirect skin contact 206. In a first example scenario, the information handling system in an embodiment may be in highly insulating base support material contact 202 when the chassis 208 is placed on top of a desk comprised of high temperature resistant material 210 (e.g. wood). The information handling system may undergo little or no change in position or orientation when placed on top of a desk, and a proximity sensing strip in the bottom chassis may not detect any nearby human body parts. The safe operating temperature associated with the table top base support material type 202 in an embodiment may be higher than the safe operating temperature in other modes in which the user's skin may be in contact with the chassis. For example, the safe operating temperature associate with the table top base support material type 202 in an embodiment may be up to 55 degrees Celsius, due to the fact that the chassis 208 is in direct contact with a high-temperature resistant material 210.

In a second example scenario, the information handling system in an embodiment may be in highly insulating base support material contact 202 when the chassis 208 is placed on top of a lap desk comprised of high temperature resistant material 212 (e.g. plastic). The proximity sensing strip in such a scenario may not detect any nearby human body parts, similarly to the previously mentioned embodiment. For example, capacitance detected may be a relatively low value compared to capacitance values measured with direct or indirect skin contact. Whether a capacitance is considered relatively low, medium, or high in an embodiment will depend upon the chassis material (e.g. metal, plastic, carbon fiber) as well type of sensor material used and the implementation of the capacitive sensor on the chassis. The low, medium, or high capacitance values are values relative to each other and yield distinct ranges of values for type of material upon which the chassis may rest. However, in contrast to the first example scenario, the information handling system in such a second example scenario may undergo changes in position or orientation as the user holding the lap desk moves beneath the information handling system. Previous methods may have immediately reacted to such movement to decrease the power supplied to the processor in order to decrease the chassis temperature for safe contact with a user's skin. However, because the chassis 208 is in contact not with a user's skin, but rather with a high temperature resistant material 212, such a decrease in power would be an overcorrection resulting in unnecessarily decreased processor performance. In contrast, the chassis temperature control system in an embodiment may maximize the power supplied to the processor while maintaining safe chassis temperatures. For example, the chassis temperature control system in such an embodiment may associate the movement of the information handling system and the lack of nearby human body parts detected by the proximity sensor in such a second example scenario with the table top base support material type 202, associated with a safe operating temperature of up to 55 degrees Celsius.

In a third example scenario, the information handling system may be in direct skin contact 204 when the chassis 208 is placed in direct contact with the user's skin 214. In contrast to the second example scenario, the proximity sensing strip in such an embodiment may detect a nearby human body part. The proximity sensing strip in an embodiment may detect a nearby human body part by detecting a capacitance across the strip. In an aspect, the detected capacitance may be a relatively higher value in comparison to capacitance measured when in contact with a highly insulating material, but the relative degree of the value may vary with the material composition of the chassis, the configuration of the capacitance touch sensor strips, or other factors. The chassis temperature control system in such an embodiment may associate detection of the nearby human body part detected by the proximity sensor in such a third example scenario with the direct skin contact base support material type 204, associated with a safe operating temperature of up to 45 degrees Celsius. Thus, the safe operating temperature of the chassis in the highly insulating base support material contact 202 and the direct skin contact 204 may vary by up to ten degrees Celsius in some embodiments.

In a fourth example embodiment, the information handling system may be in indirect skin contact 206 when an article of clothing 216 lies between the chassis 208 and the user's skin 214. Closer contact with a human body part may result in a higher detected capacitance across a proximity sensing strip than on an insulating material like a table top, but not as high as capacitance detected with bare skin contact. An example value may be INSERT, but may vary with the material composition of the chassis. In other words, the proximity sensing strip in an embodiment may be capable of determining the difference between direct and indirect contact with a user's skin. The chassis temperature control system in such an embodiment may associate detection of the nearby human body part detected by the proximity sensor in such a fourth example embodiment with the indirect skin contact base support material type 206, which may be associated with a safe operating temperature of up to 50 degrees Celsius. Thus, the safe operating temperature of the chassis in the indirect skin contact 206 and the direct skin contact 204 may vary by up to five degrees Celsius in some embodiments. By differentiating between direct skin contact 204 and indirect skin contact 206, the touch sensor based chassis temperature control system in an embodiment may provide more power to the processor than previous methods when the information handling system is placed in indirect skin contact 206, resulting in greater performance while still maintaining safe temperature conditions.

Figure 3:
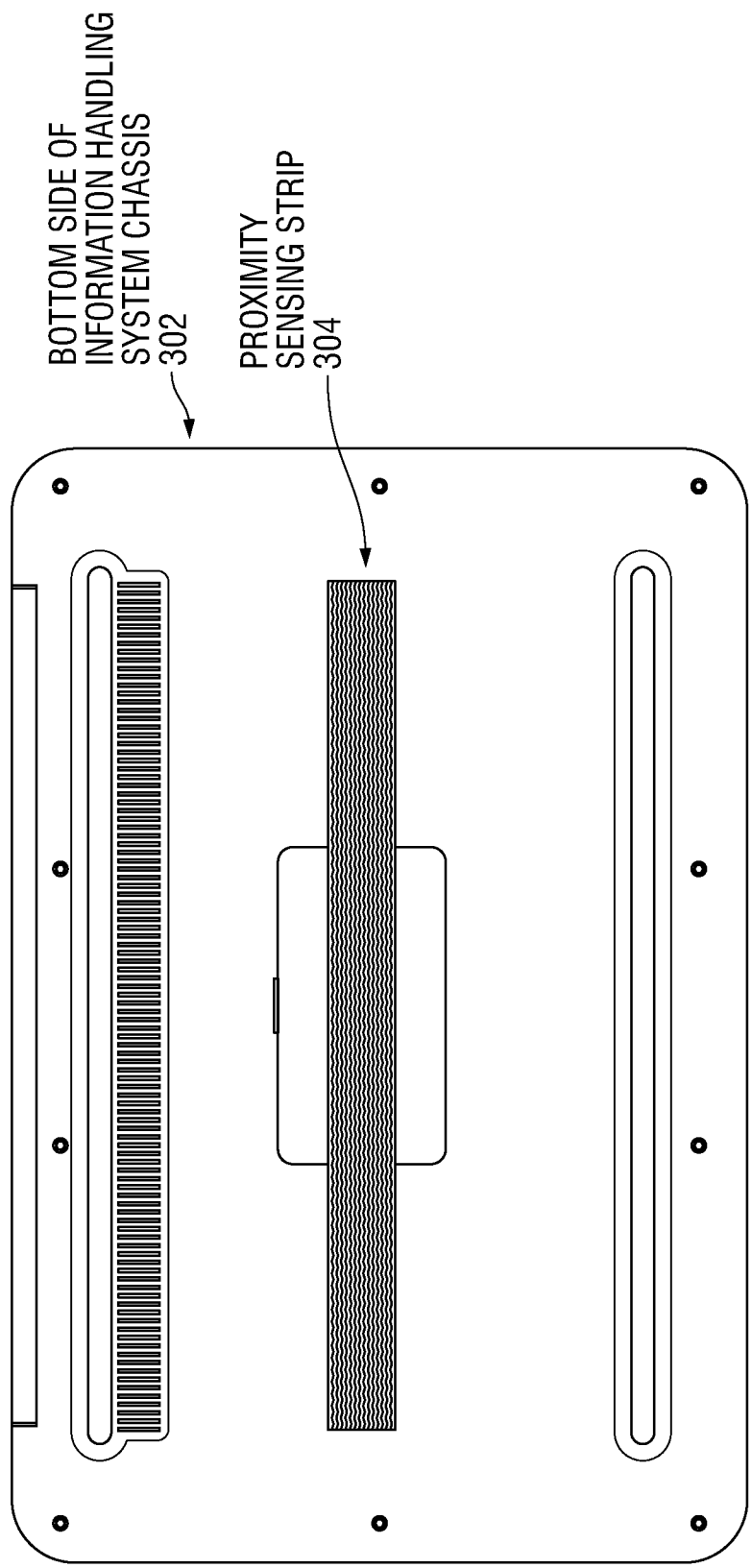
FIG. 3 is a graphical diagram illustrating a proximity sensing strip according to an embodiment of the present disclosure.

FIG. 3 is a graphical diagram illustrating a proximity sensing strip incorporated within a bottom chassis of an information handling system according to an embodiment of the present disclosure. The chassis in an embodiment may comprise an outer case or shell of an information handling system such as a tablet device, laptop, or other mobile information handling system. As shown in FIG. 3, the bottom side of the chassis 302 in an embodiment may incorporate a proximity sensing strip 304. For example, the proximity sensing strip 304 may be oriented to along the width of the bottom side of the chassis 302 and may be placed in a location that would likely come into contact with a user's skin if placed directly on the user's lap. The proximity sensing strip 304 in an embodiment may be comprised of one or more strips of metallic inductive substance. The proximity sensing strip 304 in an embodiment may detect a change in capacitance across its surface in order to detect proximity of a human body part. Further, the proximity sensing strip 304 may be capable of differentiating between direct and indirect contact with a user's skin based on differences in capacitance across its surface in either scenario. The proximity sensing strip may be passive or supplied with some power to provide additional sensitivity in some embodiments.

Figure 4:
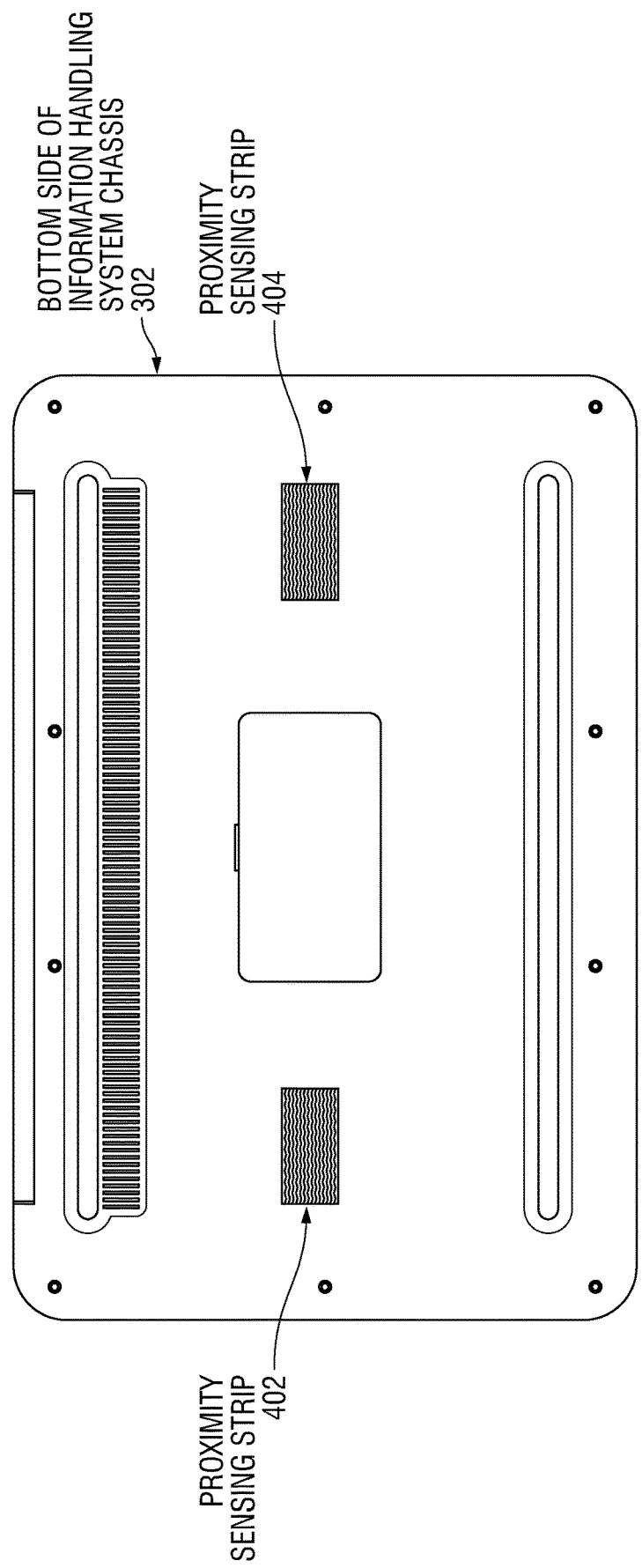
FIG. 4 is a graphical diagram illustrating a plurality of proximity sensing strips according to an embodiment of the present disclosure.

FIG. 4 is a graphical diagram illustrating a plurality of proximity sensing strips incorporated within a bottom chassis of an information handling system according to an embodiment of the present disclosure. In another example embodiment, the bottom side of the information handling system chassis 302 may include a plurality of proximity sensing strips. For example, the bottom side of the information handling system chassis 302 may include proximity sensing strip 402 placed in a location that would likely come into contact with a user's right thigh if placed directly on the user's lap. As another example, the bottom side of the information handling system chassis 302 may include proximity sensing strip 404 placed in a location that would likely come into contact with a user's left thigh if placed directly on the user's lap. Several locations across the chassis of the information handling system are contemplated in various embodiments.

Figure 5:
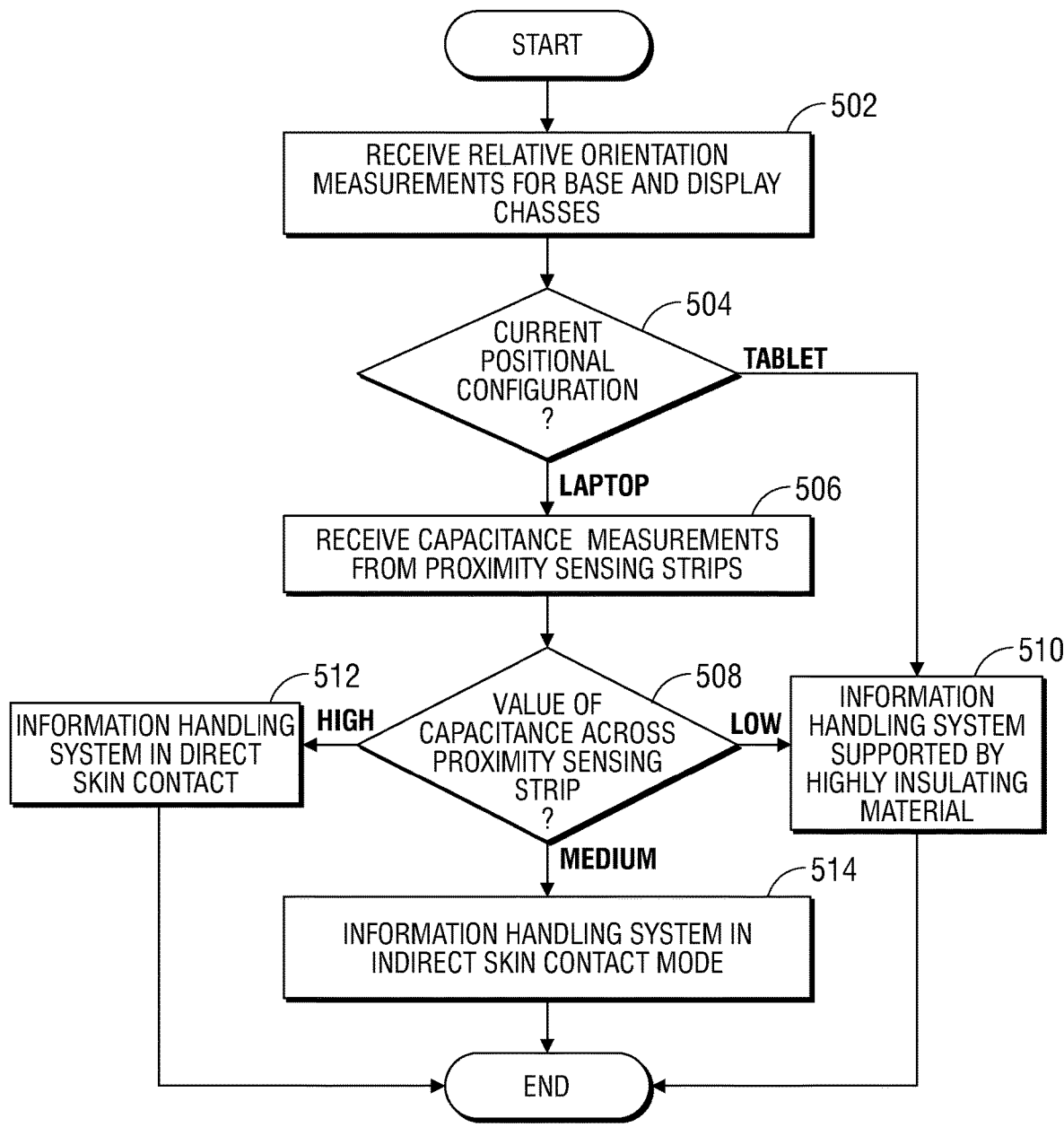
FIG. 5 is a flow diagram illustrating a method of determining an information handling system base support material type according to an embodiment of the present disclosure.

FIG. 5 is a flow diagram illustrating a method of determining an information handling system base support material type based on orientation and proximity sensing data according to an embodiment of the present disclosure. As described herein, the chassis temperature control system in an embodiment may be capable of optimizing performance of an information handling system based on the type of material supporting the base chassis as detected by touch sensors on the chassis, while maintaining safe temperature standards. In order to do so, the chassis temperature control system in an embodiment may first determine the current physical configuration of the information handling system based on data indicating orientation of the base chassis with respect to the display chassis.

At block 502, the chassis temperature control system in an embodiment may receive a relative orientation measurement for the base chassis with respect to the display chassis. For example, in an embodiment described with reference to FIG. 1, the information handling system 100 in an embodiment may include an inertial measurement unit (IMU) 134, and/or other sensors (e.g. gyroscope, accelerometer, hall effect sensors, hinge sensors, positional detectors, IR sensors, auditory sensors) capable of measuring, alone or in tandem, the movement, rotation, or positional configuration of one or more portions of the information handling system with respect to other portions of the information handling system. The information handling system 100 in an example embodiment may include an IMU 134 located within the base chassis of the information handling system housing the keyboard input device 112, and a second IMU 134 located within the display chassis housing the video display 110. Comparing measurements taken by each of these two IMUs, the processor 102 in an embodiment may be capable of determining the positional configuration of the information handling system (e.g. laptop configuration, tablet configuration, tent configuration).

The chassis temperature control system in an embodiment may determine the current positional configuration of the information handling system based on the received orientation measurements at block 504. Chassis of the information handling system may be placed in a plurality of physical configurations defined by the angle of rotation between a base chassis housing a keyboard (physical or virtual) and a display chassis housing a video display in an embodiment. One example of a physical configuration in embodiments of the present disclosure includes a laptop configuration in which the base chassis supports the weight of the information handling system, and wherein the base chassis is rotated between zero and 180 degrees from the display chassis. Another example physical configuration is a tent configuration in which the base chassis is rotated between 180 and 300 degrees from the display chassis. In the tent configuration, the thin edge of the base chassis below the bottom of the keyboard and the thin edge of the display chassis above the top of the video display may support the weight of the information handling system, placing it in a tent-like shape. In yet another example, the information handling system may be placed in a tablet configuration in which the base chassis is rotated between 300 and 360 degrees from the display chassis, and the portion of the base chassis housing the keyboard supports the weight of the information handling system.

If the information handling system is currently placed in a laptop configuration, the method may proceed to block 506 where measurements from a proximity sensor on the base chassis may be taken. In one embodiment, if the information handling system is placed in the tent configuration, it may be assumed the information handling system is being handled directly by the user, and the method may proceed to block 512. In other embodiments, it may be determined the likelihood of a user's skin coming into contact with the bottom of the base chassis is very low when the information handling system is placed in a tent configuration, and the method may proceed to block 510. In one embodiment, if the information handling system is placed in the tablet configuration, it may be assumed the likelihood of a user's skin coming into contact with the bottom of the base chassis is very low because the base chassis is placed substantially parallel to the display chassis, and the method may proceed to block 510. In another embodiment, it may be assumed the information handling system is being handled directly by the user when the information handling system is placed in a tablet configuration, and the method may proceed to block 512.

In an embodiment in which the information handling system is placed in the laptop configuration, the chassis temperature control system may receive a capacitance measurement from one or more proximity sensing strips at block 506. Capacitance across the proximity sensing strip may be detected and/or recorded by an integrated circuit operably attached to the processor and a proximity sensing strip collocated with the bottom side of the information handling system chassis. Measurements of capacitance across the proximity sensing strips may indicate the proximity of a human body part to the bottom of the base chassis most likely to reach higher temperatures in an embodiment. Detected capacitance levels may be provided to the chassis temperature control system operating on a processor, integrated circuit, controller, or some combination of each.

At block 508, the chassis temperature control system in an embodiment may determine the value of capacitance across the proximity sensing strip. For example, the capacitance detected across the proximity sensing strips in an embodiment may range from relatively low to relatively high. The range of capacitance values falling within the low, medium, and high labels may be dependent upon the material composition of the chassis (e.g. metal, plastic, carbon composite) in some embodiments. In other embodiments, the material or configuration of the capacitive sensor may vary and yield different low, medium, or high ranges. For example, these values may vary considerably depending on the configuration of the proximity sensing strips, length of proximity sensing strips, distance between the proximity sensing strips, the existence of one or more sensor zones or the composition of the chassis. In some embodiments, the proximity sensing strips may be embedded in an insulating material within the chassis, or they may be embedded in an insulating skin placed over the chassis. Thus, the implementation of the capacitive sensor with the chassis will vary the actual ranges of low, medium, and high detected capacitances depending upon implementation. Thus, low, medium, and high ranges are relative to each other are determinative of the types of material upon which the chassis and capacitive sensor may rest.

If the information handling system is placed in a laptop configuration and the capacitance measurements for proximity sensing strips fall within the low range, or if the information handling system is placed in a tablet configuration, the chassis temperature control system in an embodiment may determine the information handling system is in a highly insulating base support material contact at block 510. In such a scenario, the maximum safe temperature of the chassis may be significantly higher than the maximum safe temperature of a chassis in contact with human skin (e.g. a difference of up to ten degrees Celsius). Upon determination of the base support material type of the information handling system as a highly insulating material, the method may then end.

If the information handling system is in a laptop configuration and the change in capacitance across the proximity sensing strip meets or exceeds a high capacitance value, or if the information handling system is placed in a tent configuration, the chassis temperature control system may determine the information handling system is in direct skin contact at block 512. For example, in an embodiment described with reference to FIG. 2, if the change in capacitance across the proximity sensing strip measures at or above a threshold high level relative to lower capacitance readings by the sensing strip, the chassis temperature control system may determine the chassis 208 is in direct contact with the user's skin 214. In such an embodiment, the chassis temperature control system may determine at block 512 that the information handling system is currently placed in direct skin contact 204. The method may then end.

The chassis temperature control system in an embodiment in which the information handling system is placed in a laptop configuration and a change in capacitance across the proximity sensing strip falls between the low and high capacitance values may determine the information handling system is in indirect skin contact at block 514. For example, in an embodiment described with reference to FIG. 2, if the change in capacitance across the proximity sensing strip measures falls between the low and high values, the chassis temperature control system may determine an article of clothing 216 may be located between the chassis 208 and the user's skin 214. In such an embodiment, the chassis temperature control system may determine at block 514 that the information handling system is currently placed in indirect skin contact 206. The method may then end.

Figure 6:
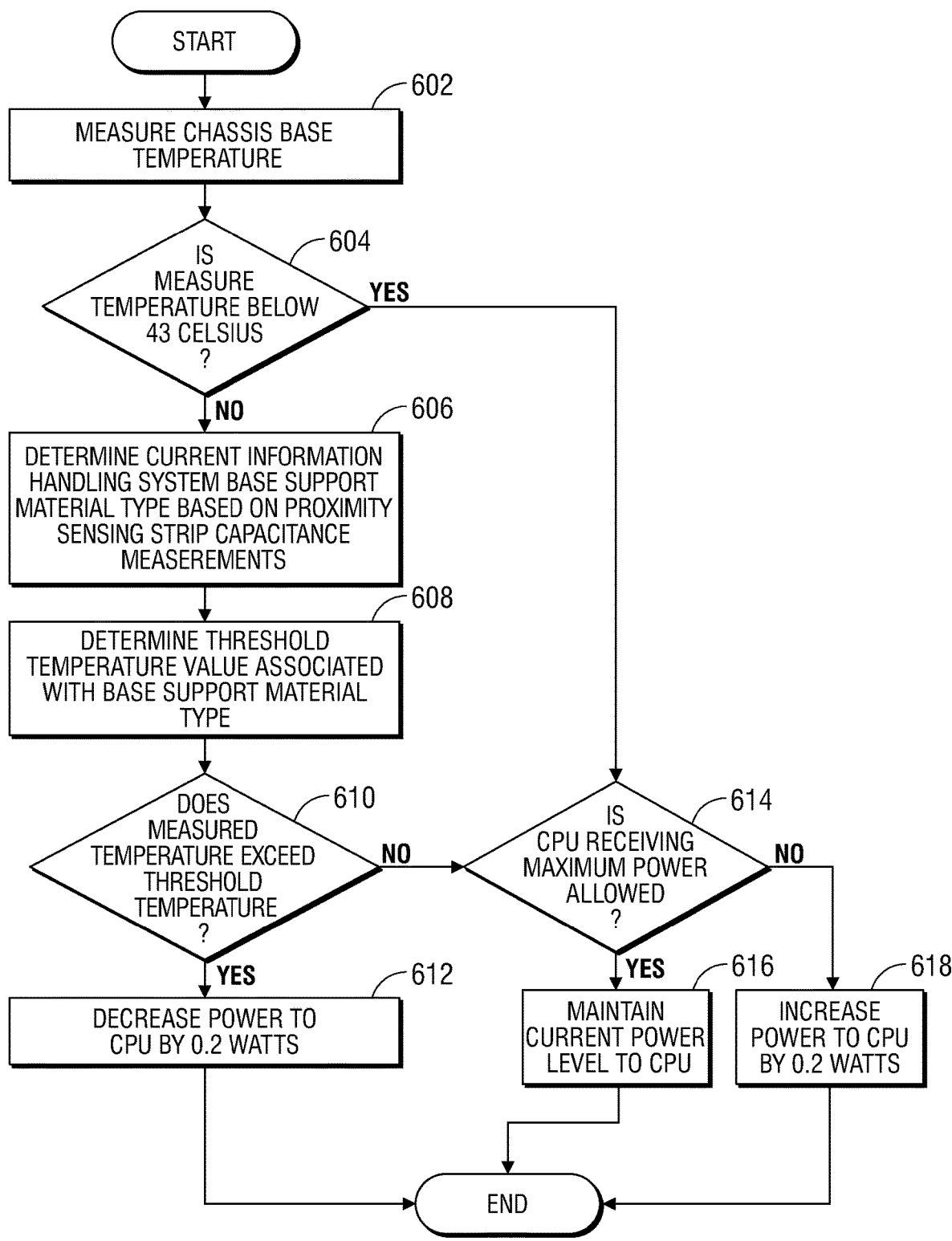
FIG. 6 is a flow diagram illustrating a method of setting processor power draws based on current base support material type according to an embodiment of the present disclosure.

FIG. 6 is a flow diagram illustrating a method of setting processor power draws based on current base support material type in order to maximize information handling system performance according to an embodiment of the present disclosure. As described herein, once the chassis temperature control system in an embodiment has determined the current base support material type of the information handling system, it may then determine the maximum amount of power that may be supplied to the CPU, GPU, or other components while maintaining safe temperature standards. In such a way, the chassis temperature control system in an embodiment may optimize performance of an information handling system based on the base support material type of the system. The method of FIG. 6 may be repeated at routine intervals, or may be performed automatically any time a change in physical configuration of the information handling system is detected, indicating the base support material type of the information handling system may have changed.

At block 602, the chassis temperature control system in an embodiment may receive a measurement of the information handling system's base chassis temperature. The temperature measurement made at block 602 may effectively gauge the temperature of the portion of the chassis that is most likely to come into contact with a user's lap when placed thereon. For example, in an embodiment described with reference to FIG. 3, the temperature measurement of this block may gauge the temperature of the bottom side of the information handling system chassis 302 located nearby the proximity sensing strip 304. In another example embodiment described with reference to FIG. 1, the temperature sensor 118 may be located nearby the proximity sensing strip 114 on the bottom side of chassis for the information handling system 100. In other embodiments, the temperature sensor 118 may be an infrared sensor enclosed within the base chassis, and may estimate the temperature of the exterior of the chassis located nearby the proximity sensing strip 114 based upon the temperature of the interior of the chassis. In still other embodiments, the temperature sensor 118 may be a thermal heat flux sensor housed within the base chassis (e.g. nearby the CPU, GPU or other component likely to emit the greatest heat), or located adjacent to the interior of the base chassis. Upon making such a temperature reading, the temperature sensor 118 may transmit the measurement to the chassis temperature control system 132 in an embodiment.

The chassis temperature control system in an embodiment may determine at block 604 whether the measured temperature of the chassis is below 43 degrees Celsius. An information handling system chassis having a temperature below 43 degrees Celsius may be safe for direct skin contact with a user, and may fall within the range of temperatures at which it is comfortable for a user to place the chassis directly on her skin for an extended period. In fact, the chassis may be safe for direct contact with human skin at least up to 45 degrees Celsius. A measured temperature below 43 degrees Celsius may indicate the power delivered to the CPU, GPU, or other component is being unnecessarily restricted. In other words, the policy directing the amount of power delivered to the CPU, GPU, or other component at such a time may be overcorrecting in order to decrease the temperature of the chassis. If the chassis temperature measurement is not below 43 degrees, the method may proceed to block 606. If the chassis temperature is below 43 degrees Celsius, the method may proceed to block 618.

At block 606, the chassis temperature control system may determine the current base support material type of the information handling system based on proximity sensing capacitance measurements. For example, the chassis temperature control system in an embodiment described with reference to FIG. 2 may determine whether the information handling system chassis 208 is currently in a highly insulating base support material contact 202, a direct skin contact 204, or an indirect skin contact 206. The chassis temperature control system in such an embodiment may make such a determination based on the physical configuration of the information handling system, and/or measurements taken by one or more proximity sensing strips, as described in greater detail with reference to FIG. 5.

The chassis temperature control system in an embodiment may determine a threshold temperature value associated with the current base support material type of the information handling system at block 608. For example, in an embodiment described with reference to FIG. 1, the chassis temperature control system 132 may access a file stored in memory 104 or memory 106 which associates each of the base support material types (e.g. table-top, direct skin contact, indirect skin contact) of the information handling system 100 with a temperature at which the chassis of the information handling system 100 most likely to make direct contact with a user's lap may safely operate without injuring the user. For example, such a file stored in memory 104 or memory 106 may associate the highly insulating base support material type with a threshold temperature value of 55 degrees Celsius, associate direct skin contact with a threshold temperature value of 45 degrees Celsius, and associate indirect skin contact with a threshold temperature value of 50 degrees Celsius.

At block 610, the chassis temperature control system in an embodiment may determine whether the measured temperature of the chassis exceeds the temperature threshold associated with the base support material type determined at block 608. In such a way, the chassis temperature control system may determine whether the temperature of the chassis most likely to come into contact with a user's skin (either directly or indirectly) is above a safe temperature for the current base support material type. If the measured temperature of the chassis exceeds the current mode temperature threshold, the temperature of the chassis may need to be decreased, and the method may proceed to block 612. If the measured temperature of the chassis does not exceed the current mode temperature threshold, the temperature of the chassis may be within safety standards for the current base support material type, and the method may proceed to block 614 to determine whether the performance of the CPU, GPU, or other components may be optimized while maintaining safety standards.

If the measured temperature of the chassis exceeds the temperature threshold, the chassis temperature control system in an embodiment may decrease the power delivered to the CPU, GPU, or other components at block 612 in order to decrease the temperature of the chassis. In an example embodiment described with reference to FIG. 1, the information handling system 100 may have a power management subsystem that manages the power and battery resource available to the information handling system according to instructions of the chassis temperature control system. When the measured temperature of the chassis exceeds the preset threshold temperature associated with the current base support material type (e.g. highly insulating material, direct skin contact, indirect skin contact), the chassis temperature control system may instruct the power management subsystem to decrease the power supplied to one or more components (e.g. CPU, GPU, etc) operating within the chassis by an incremental value. For example, the power management subsystem may decrease the power supplied to one or more components by 0.2 Watts, then reassess the impact such a decrease has upon the chassis temperature by returning to block 602. The loop between blocks 602 and 612 may be repeated until the temperature measured at block 602 does not exceed the threshold temperature associated with the current base support material type identified at block 606. In other embodiments, the incremental value by which the power management subsystems increases or decreases the power supplied to the one or more components in order to decrease chassis temperature may vary from 0.2 Watts, and may be dependent upon the degree to which the measured temperature of the chassis exceeds the threshold temperature, the chassis material, the base support material, or upon the identification of the component whose power is being decreased.

If the measured temperature of the chassis does not exceed the current mode temperature threshold or falls below 43 degrees Celsius, the chassis temperature control system may determine whether the CPU, GPU, or other component is receiving the maximum power allowed at block 614 in order to determine whether performance of the CPU, GPU, or other component may be optimized. The power supplied to the CPU, GPU, or other component in an embodiment may be limited in order to decrease the temperature of the chassis, but this may negatively impact the performance of the CPU, GPU, or other component. When the chassis temperature is below the safe threshold temperature for the current base support material type of the information handling system, the chassis temperature control system in an embodiment may determine whether the current limit on power delivered to the CPU, GPU, or other component is an overcorrection that is unnecessarily decreasing performance of the CPU, GPU, or other component. If the CPU, GPU, or other component is already receiving maximum power allowed (e.g. 25 Watts), the CPU, GPU, or other component may already be operating at peak efficiency, and the method may proceed to block 616. However, if the CPU, GPU, or other component is not receiving maximum power, indicating an over-corrective power limit is being applied, the method may proceed to block 618 to increase the power limit.

If the CPU, GPU, or other component is already receiving maximum power allotted, the chassis temperature control system in an embodiment may maintain the current power level supplied to the CPU, GPU, or other component at block 616. For example, if the maximum power that may be supplied to a CPU (as per the specifications of the CPU) is 25 Watts, and the CPU is currently receiving 25 Watts, this may indicate increasing the power supplied may not further optimize the performance of the CPU. As such, the chassis temperature control system in an embodiment may continue to allow 25 Watts to be delivered to the CPU in order to maintain such optimized performance, while simultaneously maintaining the chassis temperature within safe bounds. The method may then end.

If the CPU, GPU, or other component is not receiving maximum power, the chassis temperature control system in an embodiment may increase power to the CPU, GPU, or other component by an incremental value at block 618 in order to optimize performance of the CPU, GPU, or other component. For example, the chassis temperature control system in such an embodiment may increase the power supplied to the CPU, GPU, or other component by an incremental value of 0.2 Watts upon determining the chassis temperature exceeds the threshold temperature for the current base support material type. The incremental value may vary in other embodiments. For example, the incremental value may be 0.1, 0.5, or 1 Watt in some embodiments. In still other embodiments, the incremental value may vary based on the difference between the chassis base temperature and the current mode temperature threshold such that a greater difference between the two is associated with a larger incremental value.

The method may then proceed back to block 602 to repeat the process of comparing the temperature of the chassis to the temperature threshold value for the current base support material type. The chassis temperature control system in such an embodiment may repeat such a loop between blocks 602 and 618 until the CPU, GPU, or other component is receiving the most power possible while still maintaining a chassis temperature at or below the threshold temperature associated with the base support material type determined at block 606. In such a way, the chassis temperature control system in an embodiment may optimize CPU, GPU, or other component performance while simultaneously maintaining the chassis temperature within safety bounds.

The blocks of the flow diagrams of FIGS. 5-6 or steps and aspects of the operation of the embodiments herein and discussed above need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system operating a chassis temperature control system comprising:
   an integrated circuit operatively connected to a proximity sensing strip, and a processor;
   the proximity sensing strip integrated in an external surface of a chassis of the information handling system;
   a temperature sensor measuring an exterior temperature of a portion of the chassis of the information handling system adjacent to the proximity sensing strip;
   an orientation sensor operatively connected to the processor measuring an orientation of one portion of the chassis to another portion of the chassis to indicate between at least a laptop physical configuration mode and a tablet physical configuration mode of the information handling system, where the laptop physical configuration mode is detected;
   the integrated circuit measuring a capacitance across the proximity sensing strip such that a high capacitance measurement results in a low skin temperature limit setting in the laptop physical configuration mode;
   the processor executing code instructions of the chassis temperature control system to incrementally decrease a processor power draw limit level based on the exterior temperature measurement exceeding the low skin temperature limit setting.

2. The information handling system of claim 1 further comprising:
   the integrated circuit measuring a capacitance across the proximity sensing strip such that a medium capacitance measurement results in a medium skin temperature limit setting;
   the processor to incrementally decrease a processor power draw limit level based on the exterior temperature measurement exceeding the medium skin temperature limit setting.

3. The information handling system of claim 1 further comprising:
   the integrated circuit measuring a capacitance across the proximity sensing strip such that a low capacitance measurement results in a high skin temperature limit setting;
   the processor to incrementally decrease a processor power draw limit level based on the exterior temperature measurement exceeding the high skin temperature limit setting.

4. The information handling system of claim 1 further comprising:
   the integrated circuit measuring a capacitance across the proximity sensing strip such that a low capacitance measurement results in a high skin temperature limit setting;
   the processor to incrementally increase a processor power draw limit level based on the exterior temperature measurement below the high skin temperature limit setting, or the processor to determine a current power draw limit is at a maximum preset power threshold and to maintain the current power draw limit.

5. The information handling system of claim 1, wherein the capacitance across the proximity sensing strip measures the high capacitance measurement indicating the proximity sensing strip is in direct contact with a user's skin and the low skin temperature limit setting is 45 degrees Celsius.

6. The information handling system of claim 1, wherein the capacitance across the proximity sensing strip measures the medium capacitance measurement indicating the proximity sensing strip is in direct contact with an article of clothing covering a user's skin and the medium skin temperature limit setting is 50 degrees Celsius.

7. The information handling system of claim 1, wherein capacitance across the proximity sensing strip measures the low capacitance measurement indicating a thermally insulating material lies between the proximity sensing strip and a user's skin and the high skin temperature limit setting is 55 degrees Celsius.

8. A method of controlling temperature of an information handling system chassis based on touch sensor data comprising:
   measuring an exterior temperature of a portion of a chassis of the information handling system adjacent to a proximity sensing strip greater than 43 degrees Celsius via a temperature sensor operatively connected to a processor, where the proximity sensing strip is integrated in an external surface of the chassis of the information handling system;
   determining the information handling system physical configuration is a laptop configuration via an orientation sensor operatively attached to the processor for measuring an orientation of one portion of the chassis to another portion of the chassis convertible between a laptop physical configuration mode and a tablet physical configuration mode;
   measuring a capacitance across the proximity sensing strip via an integrated circuit operatively connected to the processor;
   identifying a preset mode temperature threshold of 45 degrees Celsius if the change in capacitance across the proximity sensing strip is above a preset high capacitance value associated with direct skin contact;
   assigning a component power draw limit for information handling system components based on a comparison of the preset mode temperature threshold to the exterior temperature of the portion of the chassis of the information handling system adjacent to the proximity sensing strip; and
   receiving power at the information handling system components according to the assigned component power draw limit.

9. The method of claim 8 further comprising:
   identifying a preset mode temperature threshold of 50 degrees Celsius if the change in capacitance across the proximity sensing strip is between the preset high capacitance value and a preset medium capacitance value associated with indirect skin contact.

10. The method of claim 8 further comprising:
    identifying a preset mode temperature threshold of 55 degrees Celsius if the change in capacitance across the proximity sensing strip is between the preset medium capacitance value and a preset low capacitance value associated with contact with an insulating material.

11. The method of claim 8, wherein the laptop configuration indicates a first chassis housing a keyboard is rotated at an angle between zero and one hundred eighty (180) degrees from a second chassis housing a digital display.

12. The method of claim 8, wherein the temperature sensor comprises a thermal heat flux sensor.

13. The method of claim 8 further comprising:
   determining the processor is receiving power at a maximum power draw threshold;
   wherein the assigned power draw limit is the maximum power draw threshold if the preset mode temperature threshold is above the exterior temperature.

14. The method of claim 8, wherein the preset high capacitance value is threshold capacitance value greater than would be detected if the proximity sensing strip were in contact with an indirect skin contact or an insulating material.

15. An information handling system operating a chassis temperature control system comprising:
   a processor executing code instructions of the chassis temperature control system to determine power received by a processor at a current power draw value is below a maximum preset power draw threshold;
   the integrated circuit measuring a first capacitance across a proximity sensing strip indicating a high capacitance associated with direct contact between the proximity sensing strip and a user's skin, where the proximity sensing strip is integrated in an external surface of a chassis of the information handling system;
   a temperature sensor measuring an exterior temperature of a portion of the chassis of the information handling system adjacent to the proximity sensing strip that is greater than a preset mode temperature threshold associated with direct contact between the proximity sensing strip and a user's skin;
   the integrated circuit measuring a second capacitance across the proximity sensing strip indicating a change to a low capacitance associated with direct contact between the proximity sensing strip and an insulating material;
   the processor executing code instructions of the chassis temperature control system to adjust a power draw limit based on the change in capacitance across the proximity sensing strip, wherein the power draw limit is increased above the current power draw value by an incremental power change value; and
   the processor to receive power according to the adjusted power draw limit.

16. The information handling system of claim 15, wherein the power draw limit is maintained at the current power draw value, if the measured second capacitance across the proximity sensing strip remains at or above the preset high capacitance value associated with direct contact between the proximity sensing strip and the user's skin.

17. The information handling system of claim 15, wherein the power draw limit is increased above the current power draw value by the incremental power change value, if the measured second capacitance across the proximity sensing strip is a medium capacitance value associated with indirect contact between the proximity sensing strip and a user's skin.

18. The information handling system of claim 15, wherein the incremental power change value is 0.2 Watts.

19. The information handling system of claim 15, wherein the maximum preset power draw threshold is 25 Watts.

20. The information handling system of claim 15, wherein the processor is a graphics processing unit (GPU).

\* \* \* \* \*